Oct. 23, 1951 W. LAMB 2,572,163
DISH DRYING AND WARMING TRAY
Filed April 7, 1949 2 SHEETS—SHEET 1

INVENTOR.
Wade Lamb.
BY
Maxwell K. Murphy
ATTORNEY.

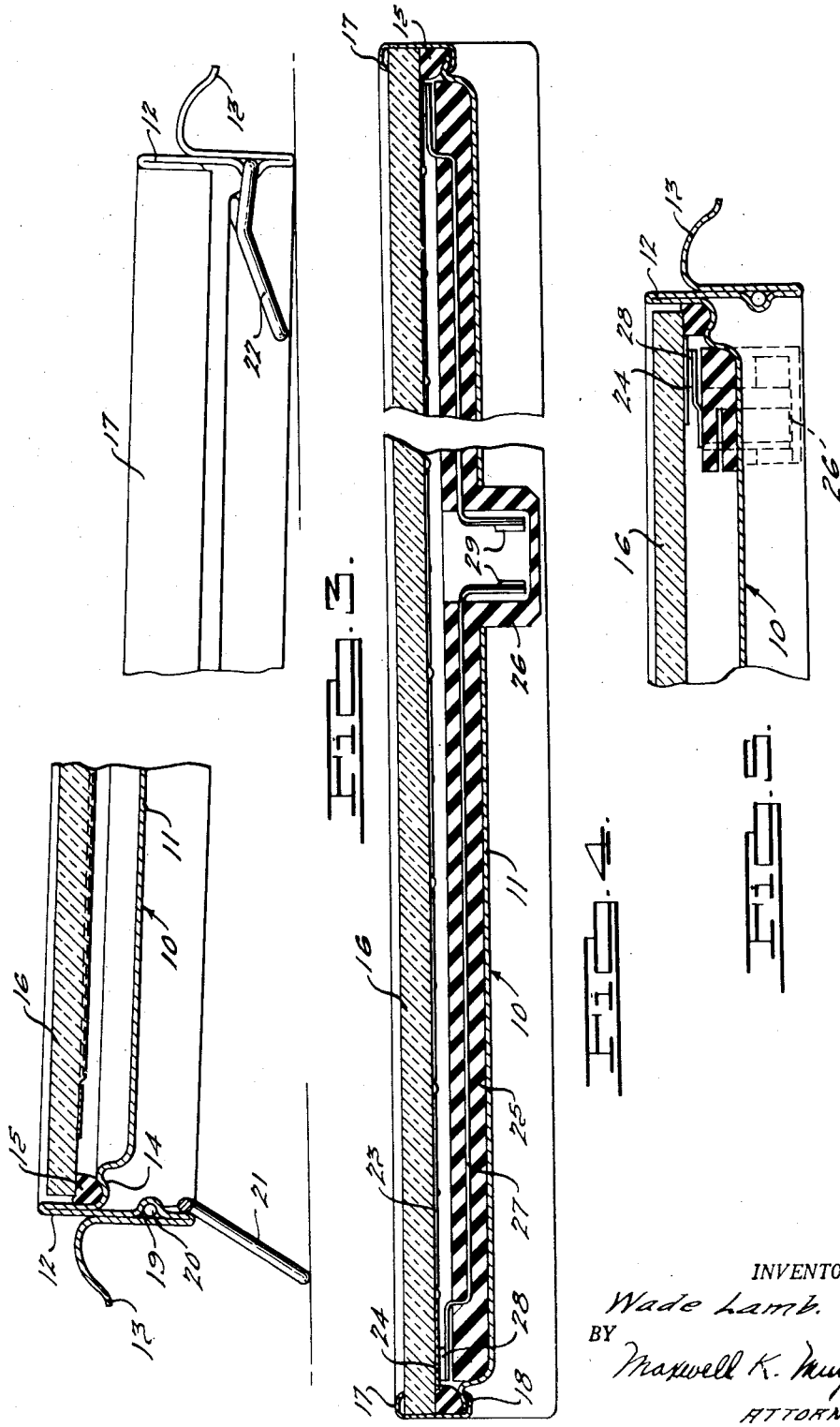

UNITED STATES PATENT OFFICE 2,572,163

DISH DRYING AND WARMING TRAY

Wade Lamb, Detroit, Mich., assignor to Radiant Heater Corporation, New York, N. Y., a corporation of Delaware Application April 7, 1949, Serial No. 86,000

7 Claims. (Cl. 219—19)

The present invention relates to an improved tray for drying dishes, warming serving plates, keeping food warm, etc.

In my co-pending application, Serial No. 71,975, filed January 21, 1949, and issued on May 22, 1951 as Patent No. 2,553,974, I have disclosed and claimed a combination portable warming tray and heater for use in warming and cooking food, in keeping plates warm, as a portable radiant heater, etc. The device disclosed in the aforesaid application is designed primarily for use in the dining room on the buffet or serving table, or on a living room coffee table.

The present invention relates to a device useful primarily in the kitchen or butler's pantry, for draining and drying dishes, warming serving plates, keeping food warm, etc. The tray disclosed and claimed herein may also be used as a portable heater in emergency cases and as a dryer for dish towels, a defrosting heater for the household refrigerator and in many other ways.

The primary object of the present invention is to provide a device of the aforesaid type which is of simple construction and economically manufactured. In accordance with this object, I have omitted all decoration, and all parts not necessary to the proper functioning of the device.

My improved tray is adapted to utilize as the heating portion thereof a sheet type heating element, preferably of tempered glass. Such heating elements are commercially available and are manufactured in accordance with the disclosure of Long Patent No. 2,119,680, granted June 7, 1938. However, other types of sheet type heating elements may be used, such as metal, rubber, etc.

Other objects and advantages of the invention will become apparent from the following description, wherein I have disclosed a preferred form of my device.

In the drawings accompanying the description,

Figure 1:
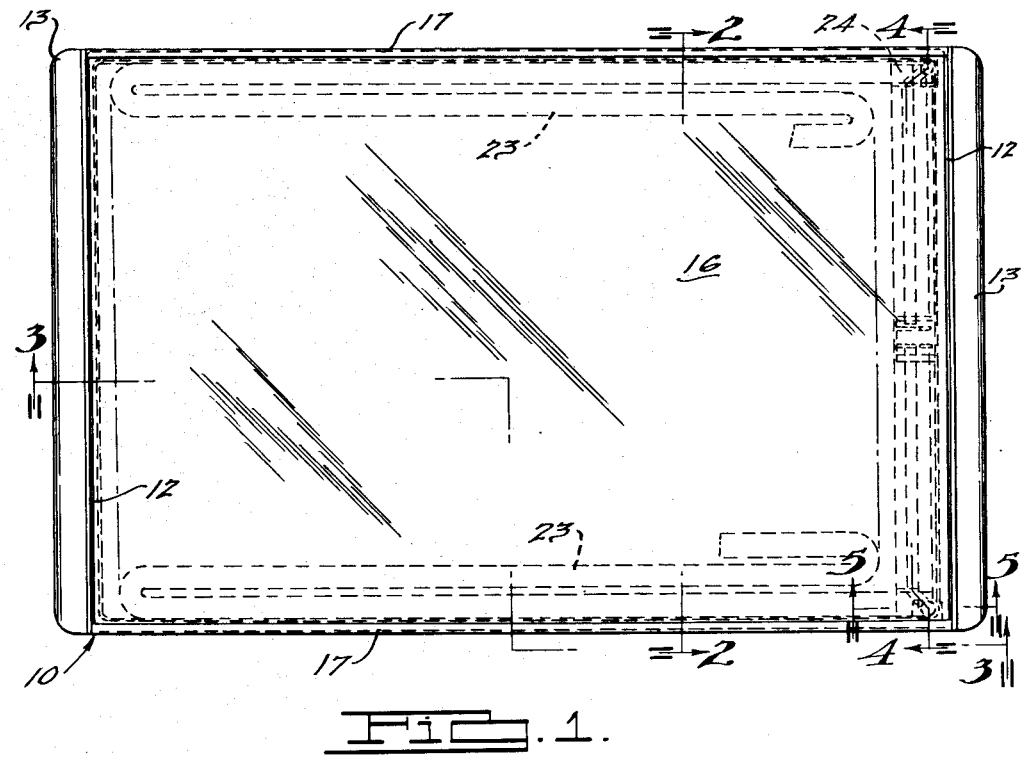
Fig. 1 is a plan view of my improved tray showing certain details in dotted lines.

Figs. 3, 4 and 5 are sectional views taken as indicated by the lines 3—3, 4—4 and 5—5 respectively of Fig. 1.

Referring to the figures, it may be seen that the tray comprises a one-piece frame and base member 10 of metal, preferably steel or aluminum. The member 10 has a central depressed portion 11 which forms the bottom of the tray and reversely bent end portions 12 which terminate in channels 13. The latter are adapted to be engaged by the fingers thus serving as handles for handling the tray.

Adjacent each end is a raised shallow channel 14 (Fig. 3) which supports a gasket 15. The gasket is preferably of rectangular form or of strip form arranged in the form of a rectangle and extends completely around the marginal bottom edge of the glass plate 16 for supporting the same and for insulating it from the metallic portion of the tray.

Figure 2:
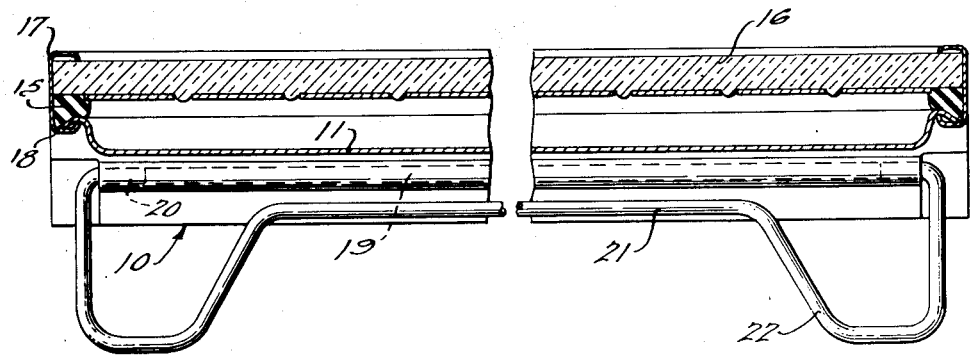
Fig. 2 is an enlarged sectional view taken on the line 2—2 of Fig. 1.

The gasket 15 is preferably formed of one of the commercially available rubber-like synthetic materials, known as "Silicones." The glass plate 16 rests on the gasket 15 and is retained in place by its contact with the upwardly bent end portions 12 of the base 10 and the clamps 17 (Figs. 2 and 4). The clamps 17 are elongated channel-like pieces of spring steel or aluminum, each of which has inturned edges at the open side thereof as illustrated.

The base 10 is formed along each side with a reversely bent portion 18 which is adapted to be engaged by the clamps 17 as shown. The top portion of the clamps rest on the top marginal edge of the glass plate 16 along the sides thereof and, because the arrangement is such that the resilient gasket 15 is slightly compressed, a tight fit results.

The clamps 17 abut the upturned ends 12 of the base at each end thereof, and thus the entire assembly is maintained in place without the use of screws, bolts or the like.

The end portions of the base 10 are formed with a cylindrical aperture 19 for receiving the inwardly bent ends 20 of support members 21. The latter are shaped as shown in Fig. 2 to provide feet 22 at each side of a central upwardly bent portion. The support members 21 may be made of wire, either stainless steel or plated. They are adapted to be pivoted about the axis of the ends 20 such that either of the positions shown in Fig. 3 may be used. In Fig. 3 the left-hand support 21 is in supporting position such that the tray is elevated at one end for permitting water to run off the opposite end when the device is used for drying dishes.

When the device is used as a warming tray, both support members may be folded underneath the base such that the tray rests on the ends 12, or both may be in unfolded position for supporting the tray above the surface on which it is resting. When the tray is stored, it may be hung on hooks in a closet by engaging the feet 22 with the hooks or it may be supported in this position for use as a portable radiant heater, or as a dish towel dryer, etc.

As can be seen from Figs. 1, 4 and 5, the fused alloy strip 23 forms a continuous electrical path between the terminals 24 which are positioned at opposite sides of the glass plate at one end thereof. A molded insulating member 25 of plastic material formed with a standard prong socket 26 at its center is disposed at one end of the tray. The member 25 has oppositely directed conducting strips 27 molded therein.

The strips 27 have a yieldable terminal 28 at each outer end which engages the adjacent terminal on the glass plate with slight pressure. The inner ends of the strips terminate in terminals 29 which are adapted to be engaged by a regulation two-prong electric plug.

It may therefore be seen that I have provided an extremely useful and versatile electric appliance for the kitchen or butler's pantry. The device has few parts, requires no fastenings for assembly, has nothing to get out of order, is rugged and durable, and is usable in a variety of ways as a dish dryer, plate warmer, food warmer, for making toast, as a portable heater, etc.

When used as a dish dryer, a conventional wire basket of the type commonly used in the kitchen for holding dishes while they are draining may be placed directly on the glass plate. The dishes may be sprayed or rinsed with clear water while on the plate if desired. By inclining the tray as illustrated in Fig. 3, the water will run off over the end and the heat radiated from the plate 16 will dry the dishes and silverware in a short time, making wiping unnecessary.

While I have shown a preferred example of my device for illustrative purposes, it will readily be understood that changes may be made in the size, shape and specific arrangement shown without departing from the spirit of my invention.

I claim:

1. A domestic appliance for use as a dish dryer, plate warmer or the like comprising a unitary base having a central pan shaped portion and integral end portions disposed substantially perpendicular to said central portion, a heating element of sheet form disposed between said end portions over said central portion, said base having flanges along each side thereof, and channel members adapted to embrace said flanges and the top surface of said heating element for securing said element on said base.

2. A domestic appliance for use as a dish dryer, plate warmer or the like comprising a unitary base having a central pan shaped portion and integral end portions disposed substantially perpendicular to said central portion, a heating element of sheet form disposed between said end portions over said central portion, said base having flanges along each side thereof, and channel members adapted to embrace said flanges and the top surface of said heating element for securing said element on said base, said channel members abutting said perpendicular end portions.

3. A warming tray comprising a plate-like heating element, a base member for supporting said heating element, including a pan shaped central portion and substantially perpendicular end portions, said end portions being adapted to engage said heating element at each end thereof, and channel members disposed at each side of said tray in clamping relation with the pan shaped portion of said base and said heating element.

4. A warming tray comprising a plate-like heating element, a base member for supporting said heating element, including a pan shaped central portion and substantially perpendicular end portions, said end portions being adapted to engage said heating element at each end thereof and channel members disposed in clamping relation with the pan shaped portion of said base and said heating element, said channel members being engaged by said end portions in abutting relation whereby the parts are retained in assembly without fastenings.

5. An electrically energized warming and drying tray comprising, a heating element of sheet form and a unitary base member having a pan-shaped central portion and integrally formed, substantially vertically disposed, end portions extending above and below the plane of said central portion, said heating element being disposed in abutting relationship to the end portions extending above said central portion.

6. An electrically energized warming and drying tray comprising, a heating element of sheet form and a unitary base member having a pan-shaped central portion and integrally formed, substantially vertically disposed, end portions extending above and below the plane of said central portion, said heating element being disposed in abutting relationship to the end portions extending above said central portion, said end portions extending below said central portion providing supporting legs for the tray.

7. An electrically energized warming and drying tray comprising, a heating element of sheet form, a unitary base member having a pan-shaped central portion and integrally formed, substantially vertically disposed, end portions extending above and below the plane of said central portion, said end portions being bent reversely in the vertical plane and then outwardly to form integral handles for said tray.

WADE LAMB.

REFERENCES CITED

The following references are of record in the file of this patent:

UNITED STATES PATENTS

| Number | Name | Date |
|---|---|---|
| 1,393,427 | Christoph | Oct. 11, 1921 |
| 1,436,657 | Ingersoll | Nov. 28, 1922 |
| 1,542,330 | Ball | June 16, 1925 |
| 1,754,619 | Ford | Apr. 15, 1930 |
| 1,882,901 | Reichart | Oct. 18, 1932 |
| 1,968,015 | Cooke et al. | July 31, 1934 |
| 2,119,680 | Long | June 7, 1938 |
| 2,466,085 | Dawrelio | Apr. 5, 1949 |
| 2,553,974 | Lamb | May 22, 1951 |